(12) United States Patent
He

(10) Patent No.: US 9,066,193 B2
(45) Date of Patent: Jun. 23, 2015

(54) VIRTUAL TRUNKING SYSTEM

(75) Inventor: Shunlan He, Zhejiang (CN)

(73) Assignee: ZHEJIANG UHOPE COMMUNICATIONS TECHNOLOGY CO., LTD., Binjiang District, Hangzhou, Zhejiang (CN)

( * ) Notice: Subject to any disclaimer, the term of this patent is extended or adjusted under 35 U.S.C. 154(b) by 206 days.

(21) Appl. No.: 13/816,143

(22) PCT Filed: Apr. 27, 2011

(86) PCT No.: PCT/CN2011/073388
§ 371 (c)(1),
(2), (4) Date: Feb. 8, 2013

(87) PCT Pub. No.: WO2012/022166
PCT Pub. Date: Feb. 23, 2012

(65) Prior Publication Data
US 2013/0137418 A1    May 30, 2013

(30) Foreign Application Priority Data
Aug. 19, 2010 (CN) .......................... 2010 1 0257188

(51) Int. Cl.
*H04W 4/00* (2009.01)
*H04W 4/16* (2009.01)
*H04L 29/06* (2006.01)

(52) U.S. Cl.
CPC ............. *H04W 4/001* (2013.01); *H04L 69/16* (2013.01); *H04W 4/16* (2013.01)

(58) Field of Classification Search
CPC ..................................................... H04W 4/10

USPC .............. 455/418, 419, 420, 426.1, 428, 411, 455/433, 456.1, 456.5; 370/310.1, 327, 370/395.52, 310
See application file for complete search history.

(56) References Cited

U.S. PATENT DOCUMENTS

| | | | |
|---|---|---|---|
| 2004/0034723 A1* | 2/2004 | Giroti | 710/8 |
| 2005/0227709 A1* | 10/2005 | Chang et al. | 455/456.1 |
| 2006/0009243 A1* | 1/2006 | Dahan et al. | 455/466 |

* cited by examiner

*Primary Examiner* — Kashif Siddiqui
*Assistant Examiner* — Minjung Kim
(74) *Attorney, Agent, or Firm* — Tianhua Gu; Global IP Services

(57) ABSTRACT

The present invention discloses a virtual trunking system developed on a value-added platform. At present, information islands are formed among different modes of trunkings, so that interconnection and intercommunication cannot be realized and interconnection and intercommunication of various trunkings with common communication network cannot be realized either. In the technical scheme adopted by the present invention, the virtual trunking system is characterized by comprising a mobile phone software module, a trunking dispatching desk, a terminal access server, a database server, an application server, a virtual trunking business module, a platform support module and a value-added platform, wherein the value-added platform is a CPCI (Compact Peripheral Component Interconnect) value-added platform which provides PCI (Peripheral Component Interconnect) slots and bus exchange; and the value-added platform accesses a public network through a digital relay or an IP (Internet Protocol). In the present invention, the value-added platform is interconnected with a public communication network and the mobile phone terminal serving as a client of the value-added platform is combined with the value-added platform, so that wireless trunking communication is realized.

2 Claims, 2 Drawing Sheets

VIRTUAL TRUNKING SYSTEM

CROSS REFERENCE TO RELATED PATENT APPLICATION

The present application is the U.S. national stage of PCT/CN2011/073388 filed on Apr. 27, 2011, which claims the priority of the Chinese patent application No. 201010257188.X filed on Aug. 19, 2010, which application is incorporated herein by reference.

TECHNICAL FIELD

The present invention relates to the field of trunking communication, more particularly to a virtual trunking system developed on a value-added platform.

BACKGROUND

The traditional trunking wireless communication system is a system specifically designed for special mobile communication business. Interconnection and intercommunication among various companies that provide trunking communication systems cannot be realized due to their different standards and poor openness. This not only restricts the popularization and application of trunking communication systems in industry remarkably, but also leads to high cost in system maintenance and expansion, thus development of trunking communication techniques in our country is under great limitation.

Specifically, a current trunking intercom system includes plenty of modes such as analog trunking, TETRA (Terrestrial Trunked Radio) digital trunking, GOTA (Global Open Trunking Architecture) digital trunking and the like, information islands are formed among different modes of trunking, so that interconnection and intercommunication cannot be realized, and interconnection and intercommunication between various trunkings and PSTN (Public Switched Telephone Network), IP telephone, GSM/CDMA (Global System for Mobile communication/Code Division Multiple Access) and other common communication networks cannot be realized either.

The technology for public network wireless communication is developed much faster than the technology for trunking and has already moved from post-3G generation to quasi-4G generation while wireless trunking is just developed to 2G generation, and its powerful network coverage and tremendous terminal end-users are unrivalled for wireless trunking.

SUMMARY OF THE INVENTION

The technical problem to be solved by the present invention is to overcome the shortcomings in the prior art and provide a virtual trunking system which is interconnected with a public communication network via a value-added platform, wireless trunking function-cored value-added businesses are developed on this value-added platform, value-added services are offered to users by the voice, data and picture transmission capability of wireless public network, and a mobile terminal is used as a client of the value-added platform and combined with the value-added platform, thus realizing a solution that covers wireless trunking in the aspect of functional application.

Therefore, the technical scheme below is adopted by the present invention: a virtual trunking system is characterized by comprising a mobile phone software module, a trunking dispatching desk, a terminal access server, a database server, an application server, a virtual trunking business module, a platform support module and a value-added platform.

The mobile phone software module is installed on a mobile terminal to provide an operating interface for virtual trunking and other value-added functions, adaptable to various mobile phone operating systems (windows mobile, symbian, oms, Android, etc.), used for recognition of owner number, automatic answering, loudspeaker control, volume control, contact list updating and self-definition of hot keys, and is communicated with a terminal access server via GPRS.

The trunking dispatching desk is used for data management and call control and operation of authorized trunking members by command centers at all levels, and providing a GIS (Geographic Information System) interface to realize connection with a GIS system so as to position designated trunking members, and the trunking dispatching desk has the functions of group editing, call management (single call, mass call, break-in/forced release, etc.), positioning management, state display, etc.

The terminal access server is used for message access and data communication of the mobile phone software module, and for TCP/IP communication with the application server to send calling and control instructions.

The application server serves as a message management center and a data interface center of the entire virtual trunking system, is connected with the terminal access server to implement message management and data access interfaces, is connected with the virtual trunking business module to implement call instruction interaction and data access interfaces, and performs TCP/IP communication with the trunking dispatching desk;

The database server serves as a memory center of the virtual trunking system to store business data, configuration data and user data;

The virtual trunking business module, serving as the function core of system, is mainly used for business flow and call management of the virtual trunking system, is connected with the application server to implement call instruction control and data access, is connected with the platform support module to invoke a variety of hardware resource access interfaces in order to acquire hardware support, and has the functions of single call, trunking call, break-in, forced release, emergency call by hot keys, simplex/duplex free switch, emergency conference, multistage dispatching, etc.

The platform support module is used for hardware resource access and signaling protocol management, and is connected with the virtual trunking business module to provide various hardware resource access interfaces for this module and implement resource management to complete interactive analysis for various signaling, such as sip, No7 and PRI, and also complete call management flow;

The value-added platform is a cPCI value-added platform with 4 slots, 5 slots, 8 slots or 14 slots in general and serves as a hardware source platform for the entire virtual trunking system to provide PCI slots and bus exchange, and this value-added platform accesses a public network through a digital relay or an IP. At least a CPU main control board, an IR08 board, an IP256 board and an NIVR board are inserted onto the value-added platform, wherein the CPU main control board performs real-time management for various boards inside the platform and is capable of supporting real-time master/slave transfer, the IR08 board provides resources including DT (every single board supports 8E1 access), DTMF (every single board supports 256 paths), EC (Echo cancellation, every single board supports 256 paths), MB (Messaging bridge, every single board supports 256 messaging channels) and the like, NIVR (Voice recording/playing resource, every single board supports 256 recording and 256 playing in a concurrent manner), and IP256 (IP single board, every single board supports 256 concurrent IP voice processing).

Being different from traditional wireless trunking (wireless trunking services of a private network are provided via base stations and switch equipment), the present invention based on a value added platform achieves development of virtual trunking value-added services on this value added platform, and what are provided from service end are not only a variety of functions of traditional wireless trunking, but also other communication services including multi-party conference, multistage dispatching and the like and multimedia services including picture, short message and the like.

The present invention is featured by the facts that a novel value-added service application is implemented on a value-added platform, virtual trunking services are developed on this platform by means of strong features of the value-added platform such as full voice interaction, multimedia processing of data and flexible business customization ability (which are unreachable for the current core network switch equipment and other public network switch equipment), and in cooperation with a mobile phone software module on mobile terminal, a value-added service system is implemented that covers traditional wireless trunking in the aspect of function, is much superior to wireless trunking in the aspect of network coverage, frequency band range and data transmission capability, and much lower than private network wireless trunking in construction cost.

The present invention will be further described below with reference to the drawings of description and the embodiments.

DETAILED DESCRIPTION OF THE EMBODIMENTS

Figure 1:
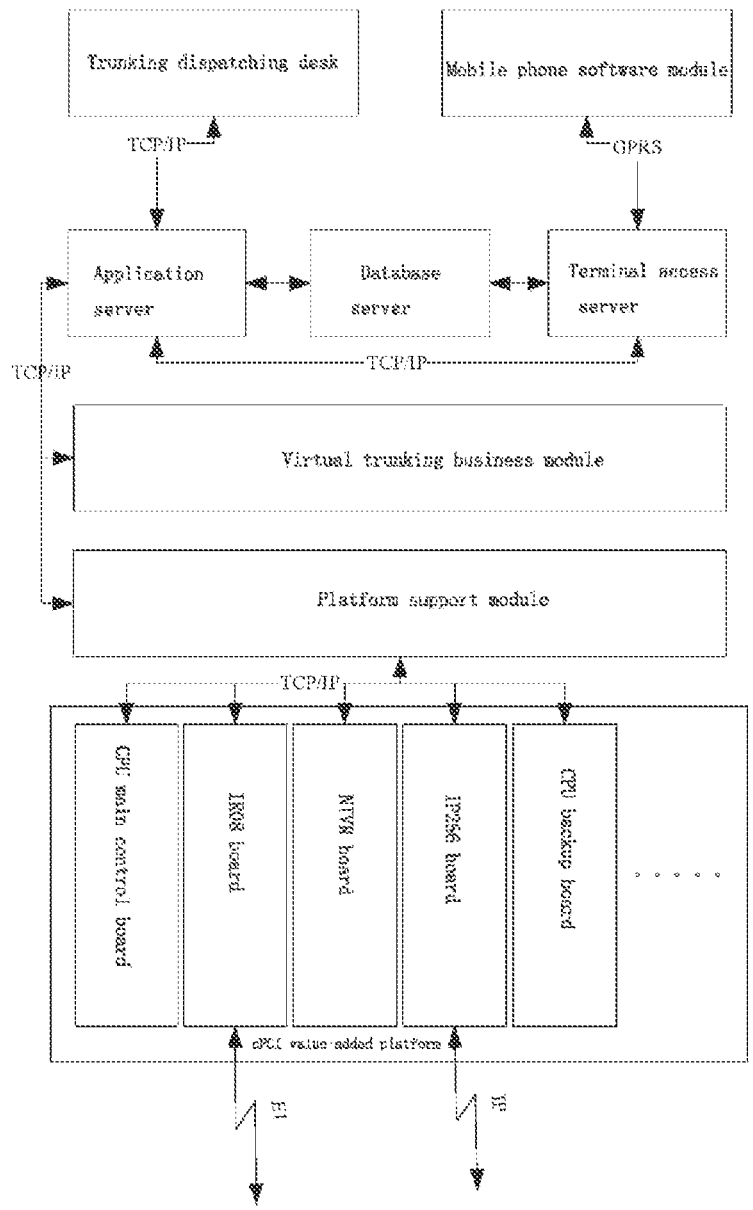
FIG. 1 is a schematic diagram of the present invention.

In a virtual trunking system as shown in FIG. 1, the mobile phone software module is installed on a mobile terminal to provide an operating interface for virtual trunking and other value-added functions, adaptable to various mobile phone operating systems (windows mobile, symbian, oms, Android, etc.), has the functions of recognition of owner number, automatic answering, loudspeaker control, volume control, contact list updating and self-definition of hot keys, and is communicated with a terminal access server via GPRS.

The trunking dispatching desk is used for data management and call control and operation of authorized trunking members by command centers at all levels, and providing a GIS interface to realize connection with a GIS system so as to position designated trunking members, and the trunking dispatching desk has the functions of group editing, call management (single call, mass call, break-in/forced release, etc.), positioning management, state display, etc.

The terminal access server is used for message access and data communication of the mobile phone software module, and for TCP/IP communication with the application server to send calling and control instructions.

The application server serves as a message management center and a data interface center of the entire virtual trunking system, is connected with the terminal access server to implement message management and data access interfaces, is connected with the virtual trunking business module to implement call instruction interaction and data access interfaces, and performs TCP/IP communication with the trunking dispatching desk.

The database server serves as a memory center of the virtual trunking system to store business data, configuration data and user data.

The virtual trunking business module, serving as the function core of system, is mainly used for business flow and call management of the virtual trunking system, is connected with the application server to implement call instruction control and data access, is connected with the platform support module to invoke a variety of hardware resource access interfaces in order to acquire hardware support, and has the functions of single call, trunking call, break-in, forced release, emergency call by hot keys, simplex/duplex free switch, emergency conference, multistage dispatching, etc.

The platform support module is used for hardware resource access and signaling protocol management, and is connected with the virtual trunking business module to provide various hardware resource access interfaces for this module and implement resource management to complete interactive analysis for various signaling, such as sip, No7 and PRI, and also complete call management flow.

Figure 2:
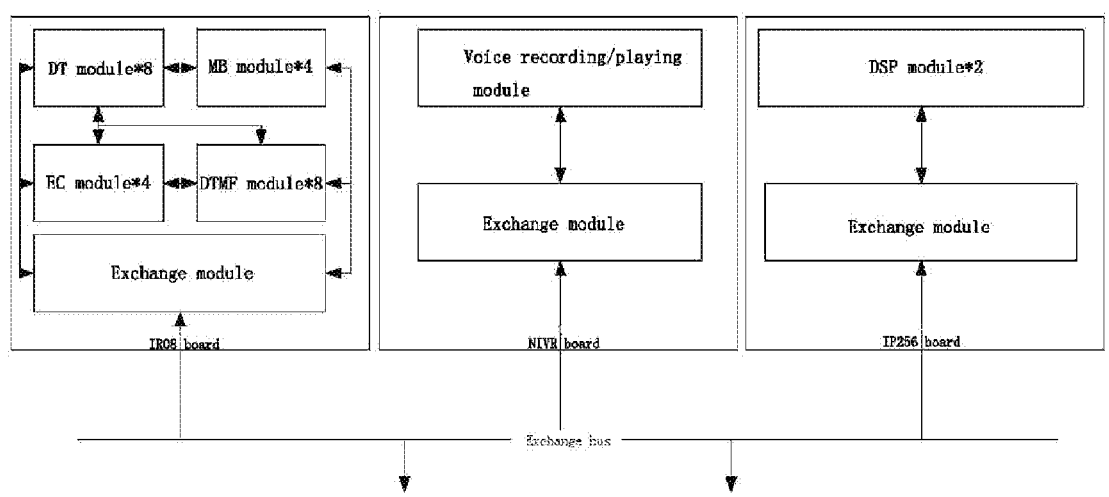
FIG. 2 is an internal logic diagram of the value-added platform of the present invention.

The system employs cPCI (Compact PCI) as a value-added platform, which serves as a hardware source platform for the entire virtual trunking system, mainly provides PCI slots and bus exchange, and accesses a public network through a digital relay or an IP in order to provide value-added services for users through the voice, data and picture transmission capability of wireless public network. As shown in FIG. 2, a CPU main control board, an IR08 board, an IP256 board and an NIVR board are inserted into the PCI slots of the value-added platform, and data exchange is implemented via a CT exchange bus. Among these boards, the CPU main control board performs real-time management for various boards inside the platform and is capable of supporting real-time master/slave transfer, the IR08 board provides modules including DT (every single board supports 8E1 access), DTMF (every single board supports 256 paths), EC (Echo cancellation, every single board supports 256 paths), MB (Messaging bridge, every single board supports 256 messaging channels) and the like, the NIVR board provides a voice recording/playing resource module and an exchange module (Voice recording/playing resource, every single board supports 256 recording and 256 playing in a concurrent manner), and IP256 (IP single board, every single board supports 256 concurrent IP voice processing). The connection interfaces of the system with a public network are provided by the IR08 board and the IP256 board, wherein the DT module in the IR08 board supports that an E1 interface is used for connection with a public network switch via a digital relay, and also supports signaling protocols including No. 7, No. 1, PRI and the like, and the IP256 board provides an IP interface for connection with an IP switch via an IP and supports Sip signaling protocol.

Detailed description is made below to various modules in FIG. 2.

A DT module is used for transmission and processing of digital relay stream. A single module supports a pair of E1s, and every single board has 8 DT modules.

An MB module, i.e. a messaging bridge board, is used for voice mixing support of multipath voices, a single module supports 64-path voice mixing, and every single board has 4 MB modules, so 256-path voice access is supported in total.

An EC module, i.e. an echo cancelation module, is used for voice stream filtration of every relay time slot during largecapacity voice mixing, in order to ensure high fidelity and high definition of voice. A single module supports 64-path voice filtration, and every single board has 4 EC modules, so 256-path echo cancelation is supported in total.

A DTMF module, i.e. a dual tone multi frequency signal module, is used for transmission and reception by keystroke, a single module supports 32 paths, and every single board has 8 DTMF modules, so 256-path transmission and reception by keystroke is supported in total.

An exchange module provides 2k*2k exchange matrix and is used for data exchange among various modules in single board and for implementing data exchange of single board with other boards inside the platform via interaction with an exchange bus of the platform.

A voice recording/playing module provides a recording/playing function for relay voice channels, and provides 256-path playing/256-path recording concurrent processing capability.

A DSP (Digital Signal Processing) module is used for RTP/RTCP (Real-Time Protocol/Real-Time Control Protocol) processing of IP voice, a single module supports 128-path G.729-format voice processing capability, and every single board has 2 DSP modules in total, so 256-path voice coding/decoding can be supported.

An exchange bus is connected with exchange modules of various single boards to realize data exchange among various boards inside the platform, and also supports a 4k*4K exchange matrix.

What is claimed is:

1. A virtual trunking system, characterized in that the system comprises a mobile phone software module, a trunking dispatching desk, a terminal access server, a database server, an application server, a virtual trunking business module, a platform support module and a value-added platform;

the mobile phone software module is installed on a mobile terminal to provide a virtual trunking operating interface for recognition of owner number, automatic answering, loudspeaker control, volume control, contact list updating and self-definition of hot keys, and is communicated with a terminal access server via GPRS;

the trunking dispatching desk is used for data management and call control and operation of authorized trunking members by command centers at all levels, and providing a GIS (Geographic Information System) interface to realize connection with a GIS system so as to position designated trunking members;

the terminal access server is used for message access and data communication of the mobile phone software module, and for TCP/IP (Transmission Control Protocol/Internet Protocol) communication with the application server to send calling and control instructions;

the application server serves as a message management center and a data interface center of the entire virtual trunking system, is connected with the terminal access server to implement message management and data access interfaces, is connected with the virtual trunking business module to implement call instruction interaction and data access interfaces, and performs TCP/IP communication with the trunking dispatching desk;

the database server serves as a memory center of the virtual trunking system to store business data, configuration data and user data, the database server is interconnected with the application server and the terminal access server;

the virtual trunking business module is used for business flow and call management of the virtual trunking system, is connected with the application server to implement call instruction control and data access, and is connected with the platform support module to implement hardware resource access;

the platform support module is used for hardware resource access and signaling protocol management, and is connected with the virtual trunking business module to provide various hardware resource access interfaces for this module and implement resource management to complete interactive analysis for various signaling and also complete call management flow;

the value-added platform is a cPCI value-added platform serving as a hardware source platform for the entire virtual trunking system and providing PCI slots and bus exchange, and the value-added platform accesses a public network through a digital relay or an IP, at least a CPU (Central Processing Unit) main control board, an IR08 board, an IP256 board and an NIVR board are inserted onto the value-added platform, the value added platform is interconnected with the platform suppot module and is used for accessing a public network.

2. The virtual trunking system according to claim 1, characterized in that the IR08 board provides a DT (Dual Tone) module, a DTMF (Dual Tone Multi Frequency) module, an EC (Echo Cancelation) module and an MB (Messaging Bridge) module.

* * * * *